(12) United States Patent
Miyashita

(10) Patent No.: US 7,357,557 B2
(45) Date of Patent: Apr. 15, 2008

(54) LIGHT GUIDE PLATE

(75) Inventor: Junji Miyashita, Fujiyoshida (JP)

(73) Assignee: Citizen Electronics Co., Ltd, Yamanashi (JP)

( * ) Notice: Subject to any disclaimer, the term of this patent is extended or adjusted under 35 U.S.C. 154(b) by 37 days.

(21) Appl. No.: 11/058,411

(22) Filed: Feb. 16, 2005

(65) Prior Publication Data

US 2005/0190578 A1    Sep. 1, 2005

(30) Foreign Application Priority Data

Feb. 16, 2004   (JP)   ............................ P2004-039086
Feb. 16, 2004   (JP)   ............................ P2004-039087

(51) Int. Cl.
    *F21V 7/04*   (2006.01)
(52) U.S. Cl. ...................... 362/615; 362/606; 362/608; 362/610; 362/621
(58) Field of Classification Search ................ 362/615, 362/606, 608, 610, 621, 607, 558, 331, 336, 362/628
    See application file for complete search history.

(56) References Cited

U.S. PATENT DOCUMENTS 6,652,109 B2 *  11/2003  Nakamura ................. 362/600
6,974,241 B2 *  12/2005  Hara et al. ................ 362/606
6,976,779 B2 *  12/2005  Ohtsuki et al. ............ 362/608
2004/0145914 A1 *  7/2004  Yu et al. ................... 362/558
2005/0231982 A1 * 10/2005  Kajiura ..................... 362/625
2005/0259438 A1 * 11/2005  Mizutani et al. ........... 362/612
2006/0256254 A1 * 11/2006  Park et al. ................. 349/65

FOREIGN PATENT DOCUMENTS

JP    2003-262734    3/2002
JP    2002-196151    7/2002

\* cited by examiner

*Primary Examiner*—Sandra O'Shea
*Assistant Examiner*—Evan Dzierzynski
(74) *Attorney, Agent, or Firm*—Browdy and Neimark

(57) ABSTRACT

A light guide plate comprises: a plate ember having a light transmitting capability; and a light incidence face provided on a side surface of the plate member; wherein the plate member changes a path of light emitted from a light source arranged to face the light incidence face and emits planar illumination light from an upper surface of the plate member onto an object to be illuminated; wherein an undulated surface portion is formed on the light incidence face. Further, the undulated surface portion is formed by smoothly connecting curved recessed portions and curved raised portions. This arrangement prevents bright lines from being produced near the light source and also prevents brightness variations, thus making uniform an intensity distribution of light that has entered the light guide plate.

7 Claims, 22 Drawing Sheets

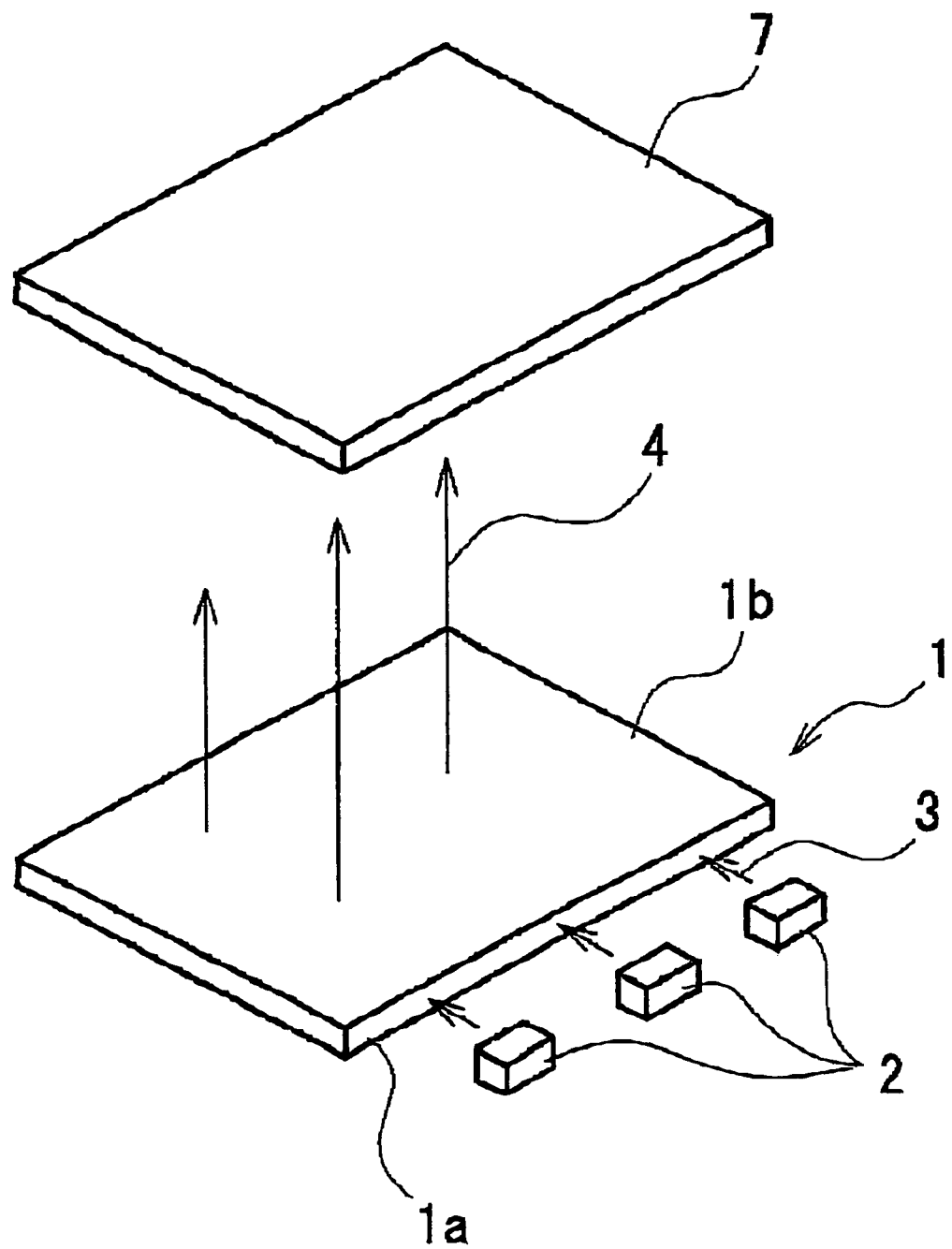

LIGHT GUIDE PLATE

CROSS REFERENCE TO RELATED APPLICATION

The application claims the priority benefit of Japanese Patent Application No. 2004-39086, filed on Feb. 16, 2004, and No. 2004-39087, filed on Feb. 16, 2004, the entire descriptions of which are incorporated herein by reference.

BACKGROUND OF THE INVENTION

1. Field of the Invention

The present invention relates to a light guide plate used for a planar light source that illuminates a liquid crystal panel from its back and more particularly to a light guide plate for a planar light source suitably applied to small liquid crystal panels used on cell phones.

2. Description of Related Art

A growing number of thin, easy-to-see liquid crystal displays having a backlight mechanism are being used as displays on small, thin information devices, such as notebook word processors or computers, cell phones and portable TV sets. Such a backlight mechanism uses a planar light source to illuminate an entire surface or a liquid crystal panel from its back. The planar light source generally comprises a light source, such as a fluorescent lamp or a light emitting diode (LED), and a light guide plate that converts a light flux into a planar light flux for illuminating the liquid crystal panel. As for the light source, an increasing number of planar light sources are using LEDs as the light source for further reductions in size and thickness and for increased longevity. These planar light sources may be classified into a direct type, in which the light source is arranged directly below the light guide plate, and a side light type, in which the light source is arranged at the sides of the light guide plate. For devices that put importance on small size and small thickness, such as cell phones, the side light type is usually adopted.

Now, a conventional side light type planar light source will be explained by referring to FIG. 1 and FIG. 2. FIG. 1 shows an example of a conventional planar light source of this kind. It basically consists of a rectangular prism-shaped light guide plate 1 made of a transparent material and a light source 2 having three LEDs arranged at the side of the light guide plate 1.

The light guide plate 1 is arranged on the back of a liquid crystal panel 7. The light guide plate 1 is often provided on its underside with a light reflection sheet 8 that directs light from the light source 2 toward the liquid crystal panel 7, as shown in FIG. 2B. On the upper surface side of the light guide plate 1 there are provided a diffusion sheet 9 that uniformly scatters light from the light source 2 and a prism sheet 10 that focuses light toward the liquid crystal panel 7.

The light guide plate 1 is a rectangular prism-shaped plate member capable of transmitting light, which is formed of, for example, a colorless, transparent plastic material. The upper surface of the light guide plate 1 is used as a light emitting face 1b and one of side surfaces of the light guide plate 1 is used as a light incidence face 1a. The light source 2 is arranged at a position facing the light incidence face 1a. A light beam 3 radiated from the light source 2 enters the light incidence face 1a and then is repetitively reflected in the light guide plate toward the light emitting face 1b as it travels in the light guide plate until those components of light incident on the upper surface at smaller than the critical angle are extracted from the light emitting face 1b of the light guide plate 1 as illumination light 4. The illumination light 4 extracted outside then illuminates the liquid crystal panel 7 from the back.

FIG. 2A and FIG. 2B show another example of a conventional side light type planar light source (see Japanese Patent Disclosure No. 2003-262734, page 2 and FIG. 3). In the planar light source of this kind, one corner portion 1d of the almost rectangular prism-shaped light guide plate 1 is cut off to form an additional side surface as the light incidence face 1a. A light source 2 made up of one LED is arranged at a position facing the light incidence face 1a. As shown in FIG. 2B, the upper surface of the light guide plate 1 constitutes a light emitting face 1b, and a bottom surface 1c opposite the light emitting face 1b is used as a light reflection surface that is formed with a fine texture or a plurality of hemispherical dots to reflect the incoming light 5 toward the light emitting face 1b.

In the above conventional side light type planar light sources when the incident light 3 from the light source 2 enters the light guide plate 1 at an incidence angle a, as shown in FIG. 3A and FIG. 3B, the light is refracted and travels in the light guide plate 1 at an angle b with respect to a normal, as indicated at 5. Since the material of the light guide plate 1, such as acrylic resin and polycarbonate resin, has a higher refractive index than that of air, the angle b with respect to the normal is smaller than the incidence angle a. At this time, the incident light 3 from the light source 2 has a directivity of the LED itself, so the directivity or the light 5, which is refracted after it has entered the light guide plate 1, is narrower than that of the incident light 3.

FIG. 4 shows directivities of the light 3 from the light source 2 and of the light 5 after it enters the light guide plate 1. FIG. 4A shows a directivity of the incident light 3 from an LED as the light source 2 and FIG. 4B shows a directivity of the incoming light S that has entered the light guide plate 1 from the light incidence face 1a. The light beam 3 of the LED as a point light source has a directivity indicated by a curve 101 in FIG. 4A. The light 5, which has resulted from the light 3 entering the light guide plate 1, has a directivity indicated by a curve 102 in FIG. 4B. As described above, the directivity of the light 5 after it has entered the light guide plate 1 is narrower than that of the incident light 3 of the LED itself. Thus, in the conventional light guide plate 1 which has the light incidence face 1a formed as a flat surface, there is a problem that a distribution of intensity of the light 5 after it enters the light guide plate 1 is ununiform.

To solve this problem, a light guide plate has been proposed in which a light incidence face of the light guide plate is provided with undulations made by a plurality of prisms of similar shape (see Japanese Patent Disclosure No. 2002-196151, pages 3-5 and FIG. 2). A light guide plate 11 shown in FIG. 5 and FIG. 6 has the similar construction to that of the conventional light guide plate 1 except that a light incidence face 11a differs in shape from the counterpart of the conventional light guide plate 1. So, only the construction of the light incidence face 11a will be explained and descriptions of other constructions omitted. This construction similarly applies also to other conventional light guide plates whose corners are cut off, so in the following explanation we take the light guide plate 11 of FIG. 5 and FIG. 6 as a representative conventional light guide plate.

As shown in FIG. 5A and FIG. 5B, the light guide plate 11 has a light incidence face 11a on one side which forms into undulations. The undulated surface portion has a uniform distribution of prismlike protrusions 12. The prismlike protrusions 12 each have a triangular shape in cross section defined by a pair of inclined surfaces 12a, 12b. Between the adjacent protrusions 12 there is a flat portion 13.

When the light incidence face 11a of the light guide plate 11 is taken as a virtual plane, the angle that light beams 15, 16 make with the normal after the beams have entered into the light guide plate 11 can be made larger than the angle they make in the case of the light guide plate 1, by the effect of the inclined surfaces 12a, 12b of the prismlike protrusions 12 on the light incidence face 11a, as shown in FIG. 6. This is true even for light beams whose incidence angle on the light incidence face 11a is large. Thus, when the light incidence face 11a is seen as a whole, a range of angle of the light beams 15, 17 that have entered into the light guide plate 11 from the prismlike protrusions 12 can be increased. Further, the light beam 16 that has entered the light guide plate 11 from the flat portion 13 enters straight into the light guide plate 11, as in the case of the planar light incidence face 11a of the light guide plate 1.

However, since in the light guide plate 11 the light incidence face 11a formed by the prismlike protrusions 12 and the flat portion 12 is discontinuous in shape, as shown in FIG. 6, the directivities of light beams 15, 16, 17 that have entered into the light guide plate 11 from the light incidence face 11a are distorted as shown in FIG. 7. The light beam 16 that enters the light guide plate 11 from the flat portion 13 of the light guide plate 11 in FIG. 6 has a directivity indicated by a curve 104 in FIG. 7. The light beam 17 that enters the light guide plate 11 from one 12a of the inclined surfaces 12 of the light guide plate 11 in FIG. 6 has a directivity indicated by a curve 105 in FIG. 7. The light beam 15 that enters the light guide plate 11 from the other 12b of the prismlike protrusions 12 of the light guide plate 11 in FIG. 6 has a directivity indicated by a curve 103 in FIG. 7.

In the conventional light guide plate 11 as described above, the light beams 15, 16, 17 that enters the light guide plate 11 from the light incidence face 11a have distorted directivities, giving rise to a problem that the light intensity distribution becomes non-uniform because of the distorted characteristics of the directivities If the light guide plate 11 with an ununiform light intensity distribution is used in a side light type planar light source for a liquid crystal display, there is a problem that bright lines are produced from the light source or the brightness on the display screen varies, significantly degrading an image quality.

SUMMARY OF THE INVENTION

An object of this invention is to provide a light guide plate for a planar light source that can solve the problems associated with the conventional light guide plates described above, prevent bright lines near the light source or brightness variations and make uniform an intensity distribution of light that has entered into the light guide plate, thereby improving a quality of display image.

To achieve the above objective, the light guide plate of this invention comprises: a plate member having a light transmitting capability; and a light incidence face provided on a side surface of the plate member; wherein the plate member changes a path or light emitted from a light source arranged to face the light incidence face and emits planar illumination light from an upper surface of the plate member onto an object to be illuminated; wherein the light incidence face forms into an undulated surface portion.

In one example, the plate member is quadrangular-shaped and has the light incidence face on one of side surfaces thereof. In another example, at least one of corner portions of the plate member is cut off to form an additional side surface, which is provided as the light incidence face.

In another example, the undulated surface portion is formed by repetitively alternating curved recessed portions and curved raised portions in a longitudinal direction of the light incidence face. In particular, the undulated surface portion in formed by smoothly connecting the curved recessed portions and the curved raised portions.

As described above, since one of its side surfaces is made the light incidence face which then forms into the undulated surface portion, the directivity of light that has entered the light guide plate can be corrected, providing a well-balanced characteristic without deviations. As a result, the intensity of light inside the light guide plate can be made uniform, preventing bright lines from being produced near the light source or eliminating brightness variations. This in turn allows a high quality side light type planar light source to be realized by the light guide plate of this invention and LEDs. Further, where the light guide plate of this invention is used as a side light type planar light source for a liquid crystal display, the liquid crystal display can produce a high quality image with reduced brightness variations.

BRIEF DESCRIPTION OF THE DRAWINGS

FIG. 1 is a perspective view showing an essential portion of a conventional side light type planar light source.

DETAILED DESCRIPTION OF THE PREFERRED EMBODIMENTS

Figure 2A:
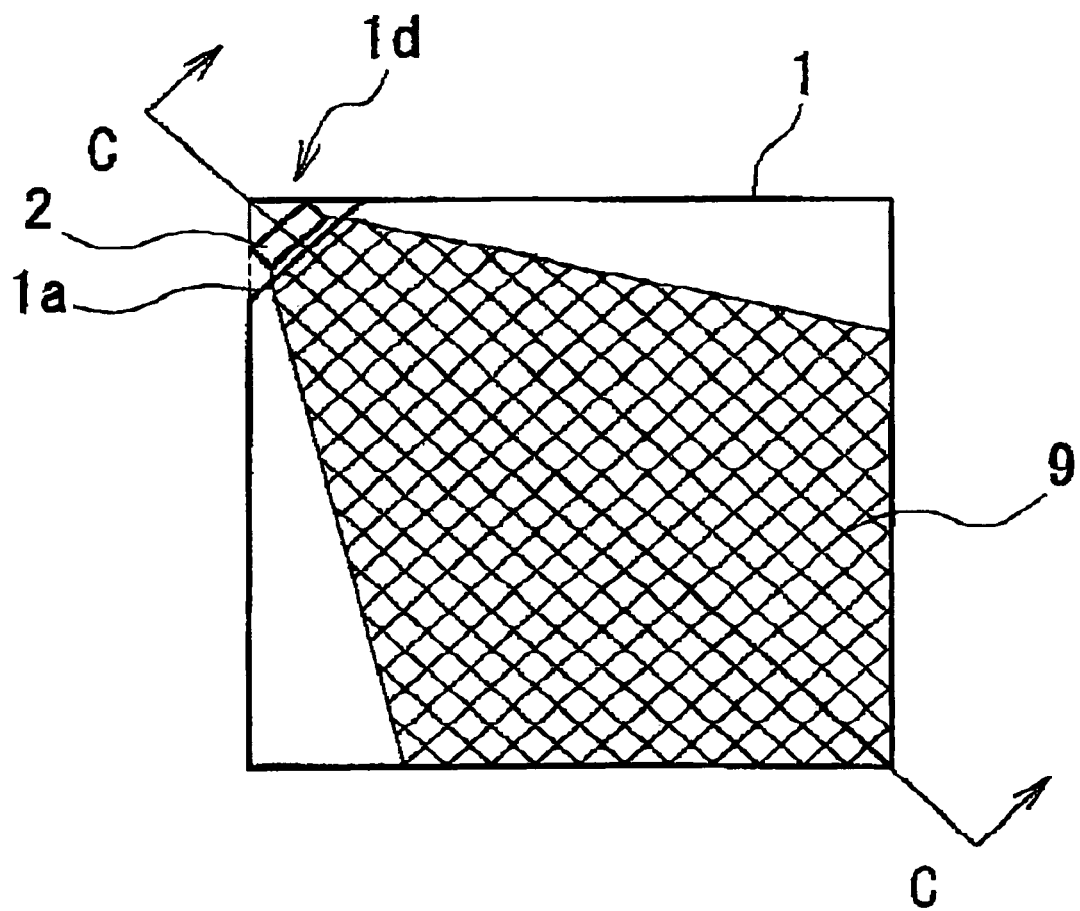
FIG. 2A is a plan view showing an essential portion of another conventional side light type planar light source.
Figure 2B:
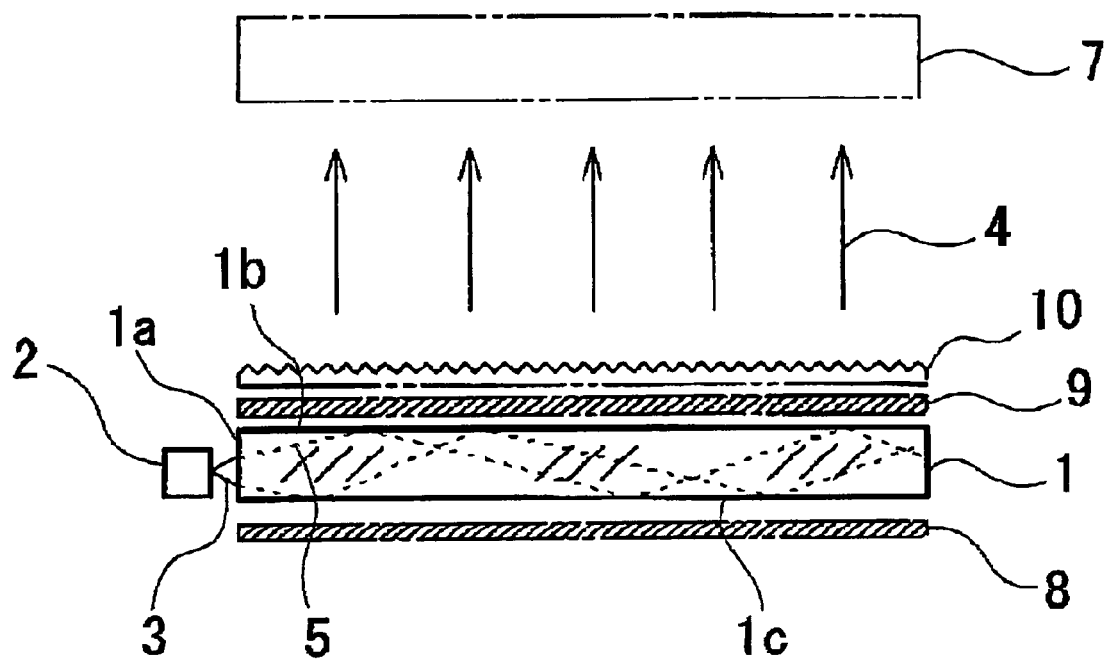
FIG. 2B is a cross-sectional view taken along the line C-C of FIG. 2A.
Figure 3A:
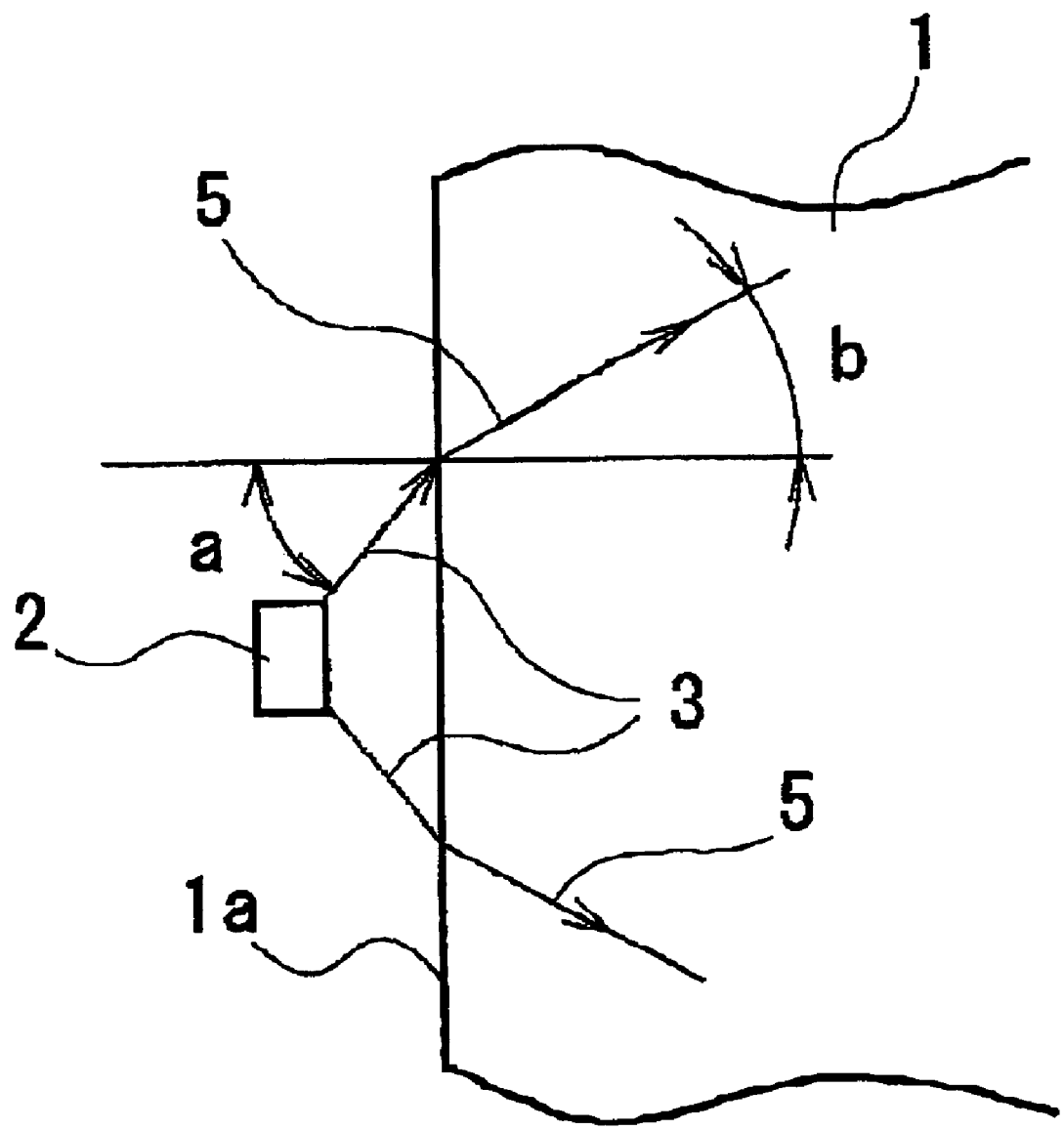
FIG. 3A is a partly enlarged plan view showing a light incidence face and its surrounding area of the conventional light source.
Figure 3B:
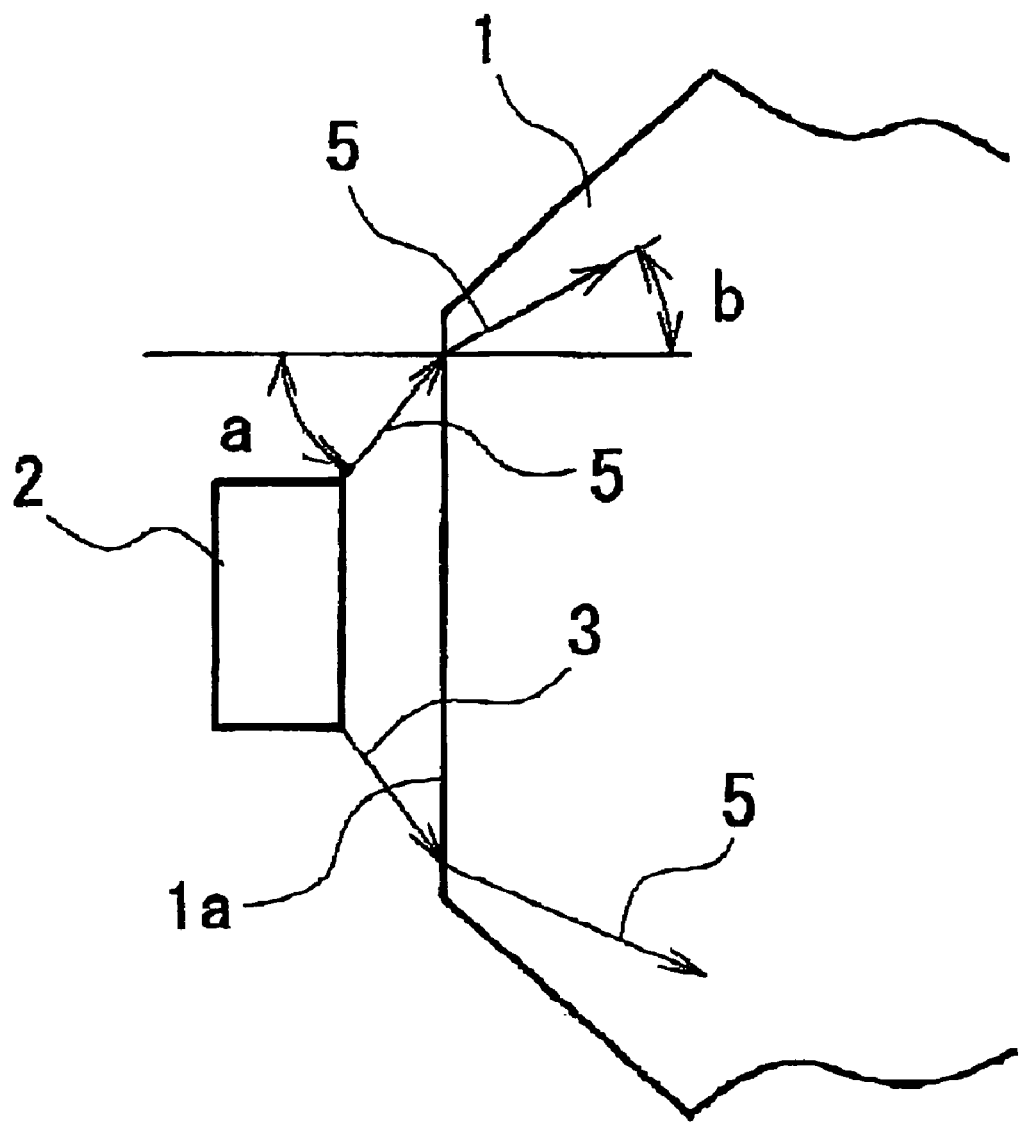
FIG. 3B is a partly enlarged plan view showing a light incidence face and its surrounding area of another conventional light source.
Figure 4A:
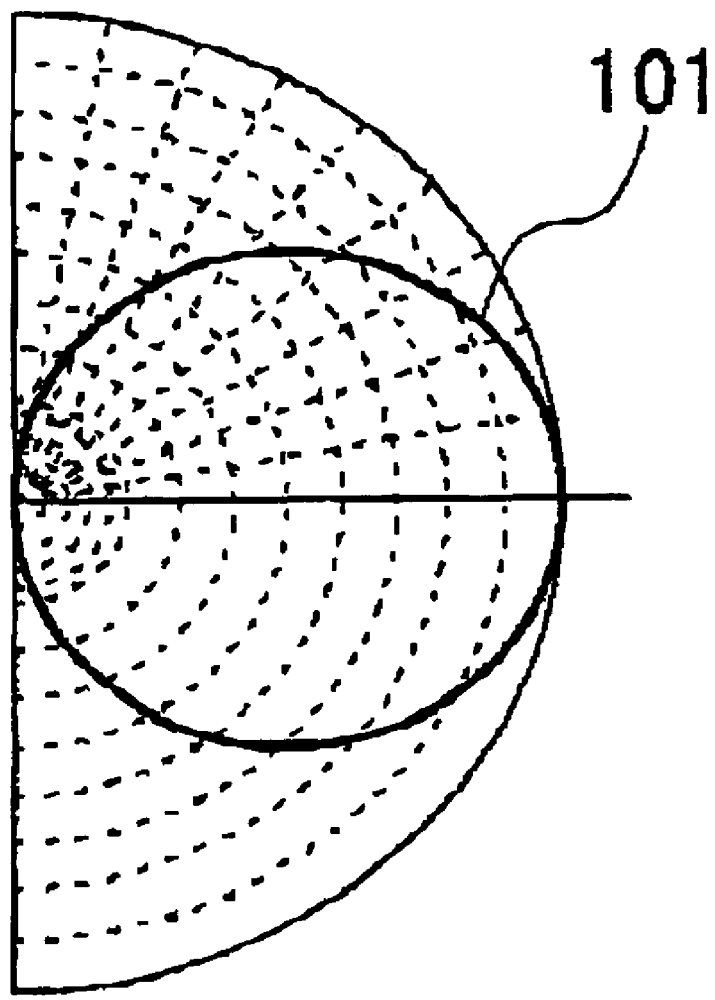
FIG. 4A is a diagram showing a directivity of a light beam emitted from a light source according to a conventional art.
Figure 4B:
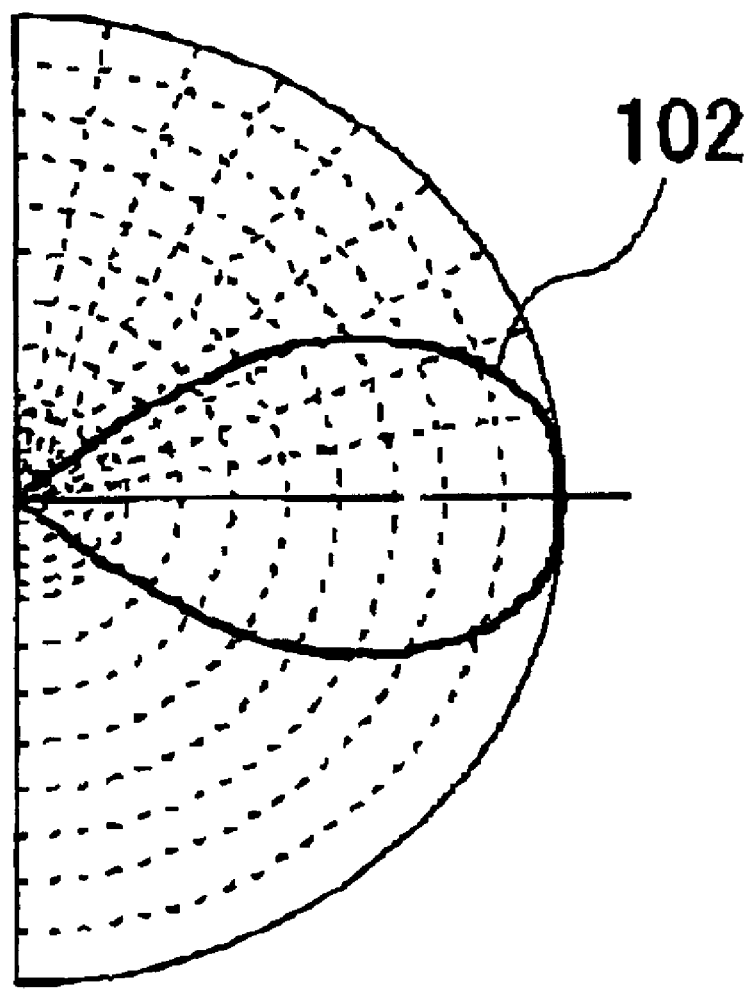
FIG. 4B is a diagram showing a directivity of a light beam that has entered into the light guide plate according to a conventional art.
Figure 5A:
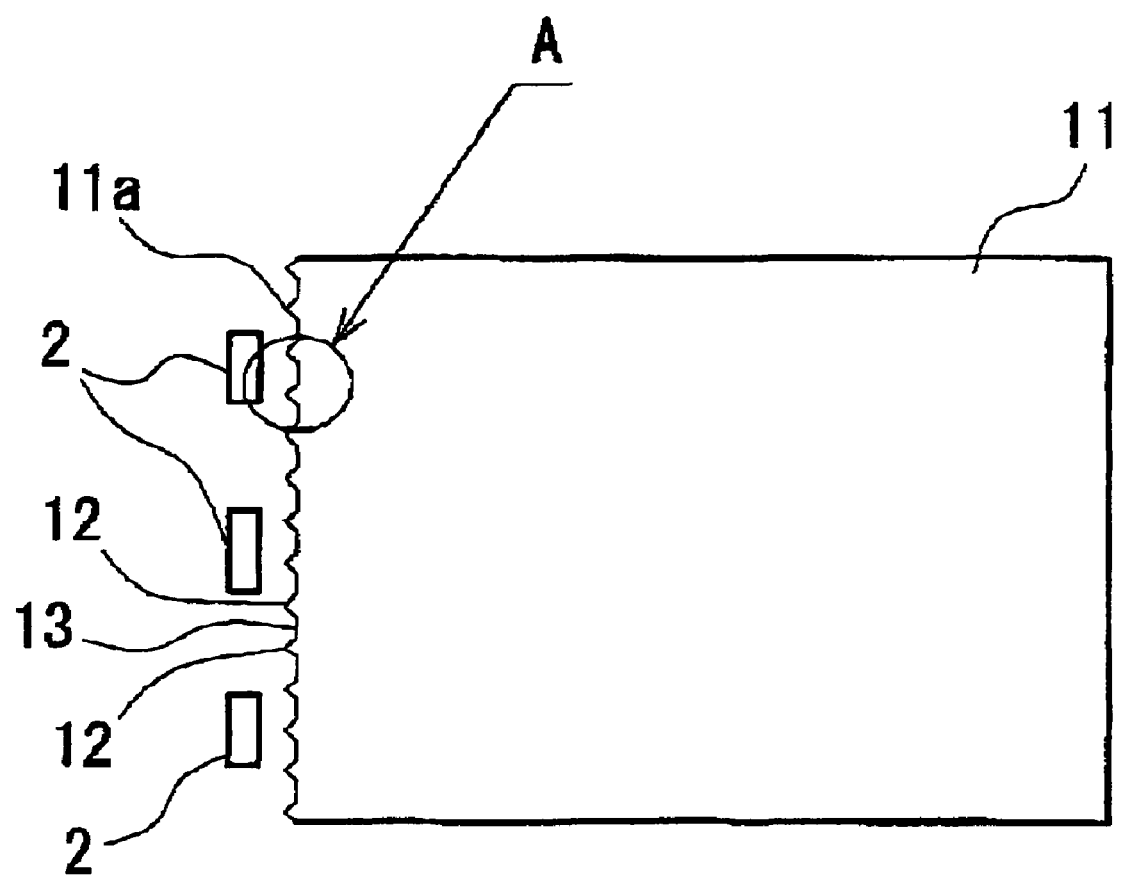
FIG. 5A is a plan view of a conventional light guide plate.
Figure 5B:
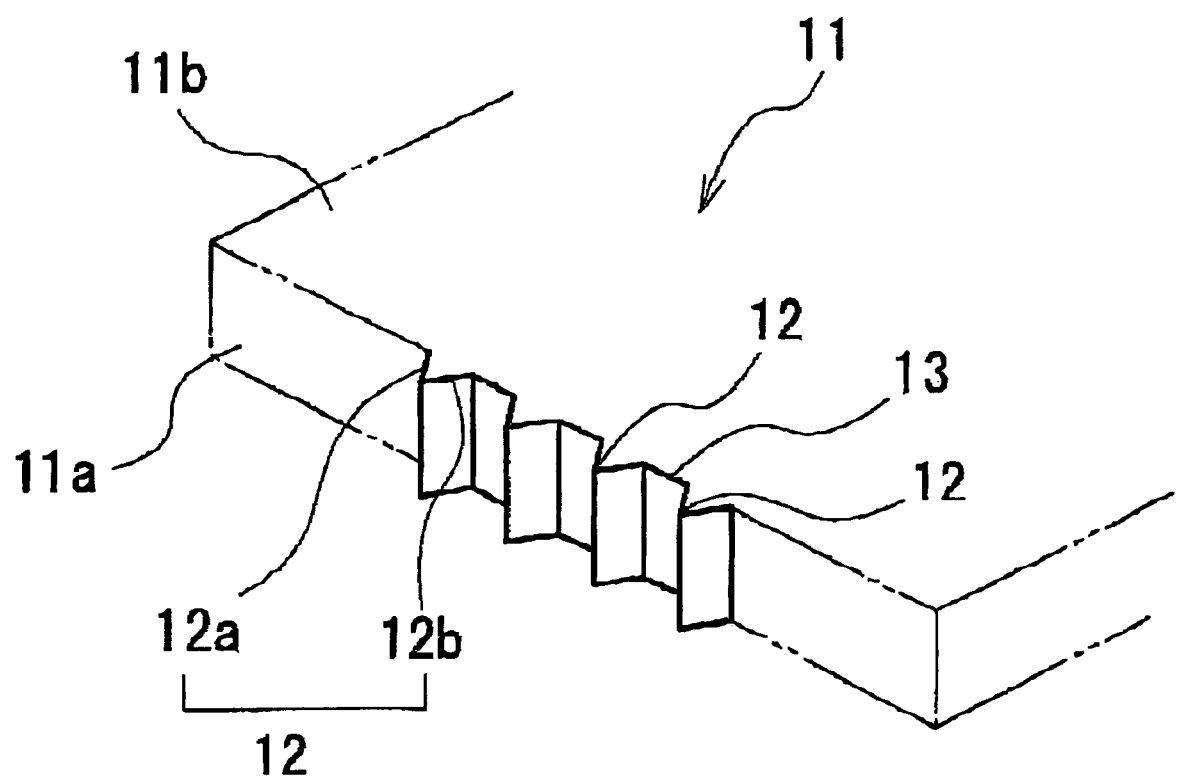
FIG. 5B is a partly enlarged perspective view of part A in FIG. 5A.
Figure 6:
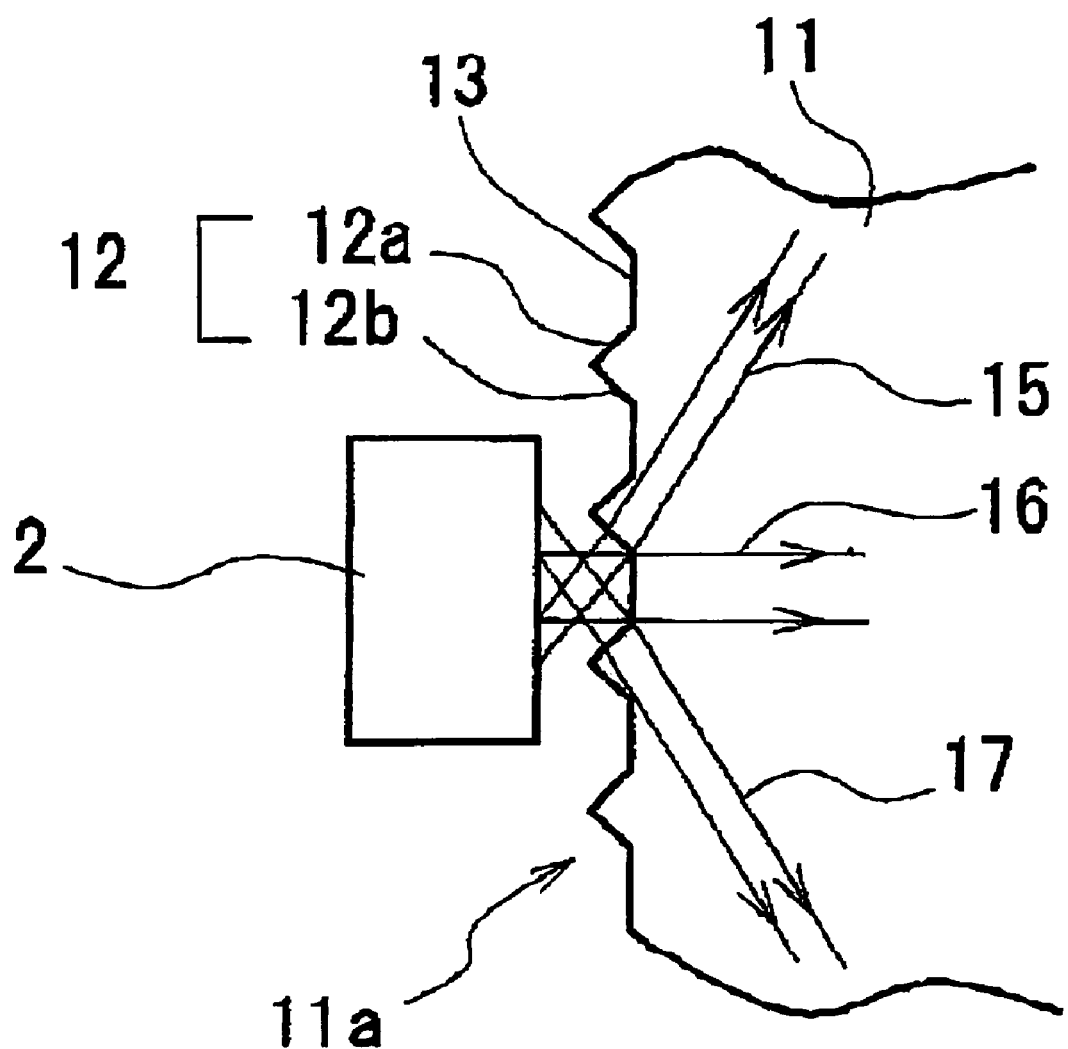
FIG. 6 is a partly enlarged plan view showing a light incidence face and its surrounding area of the conventional light guide plate.
Figure 7:
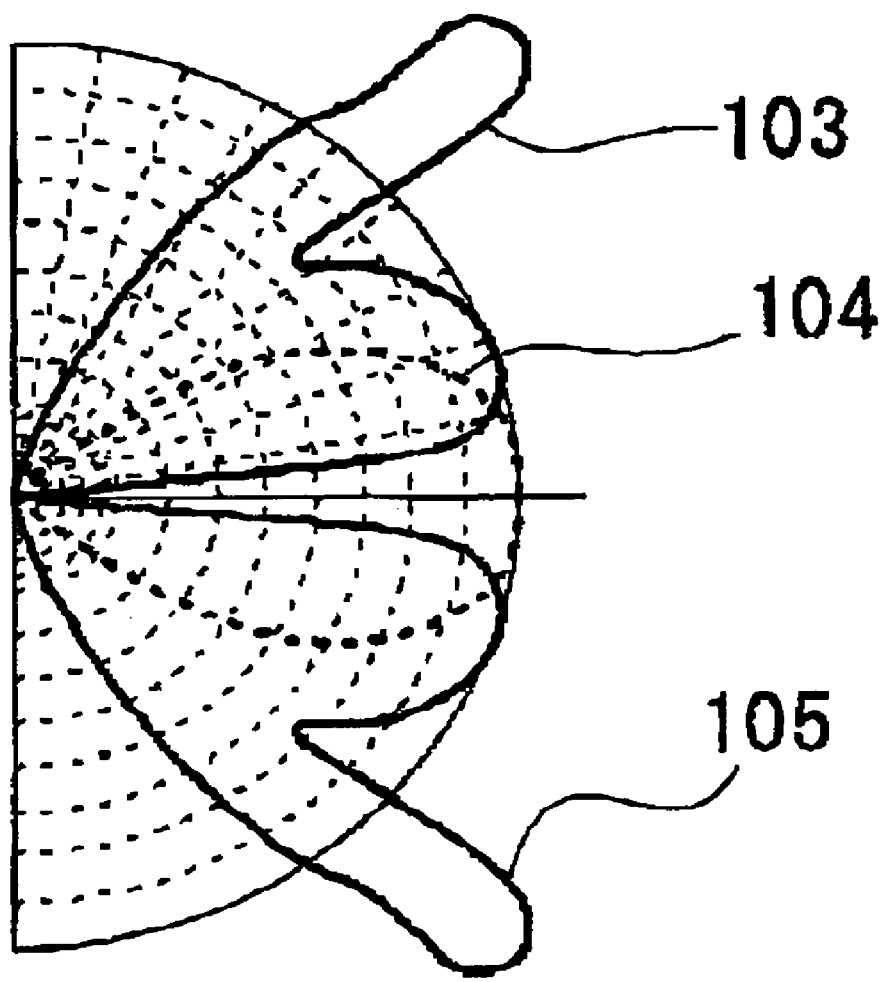
FIG. 7 is a diagram showing a directivity of light that has entered into the conventional light guide plate.
Figure 8A:
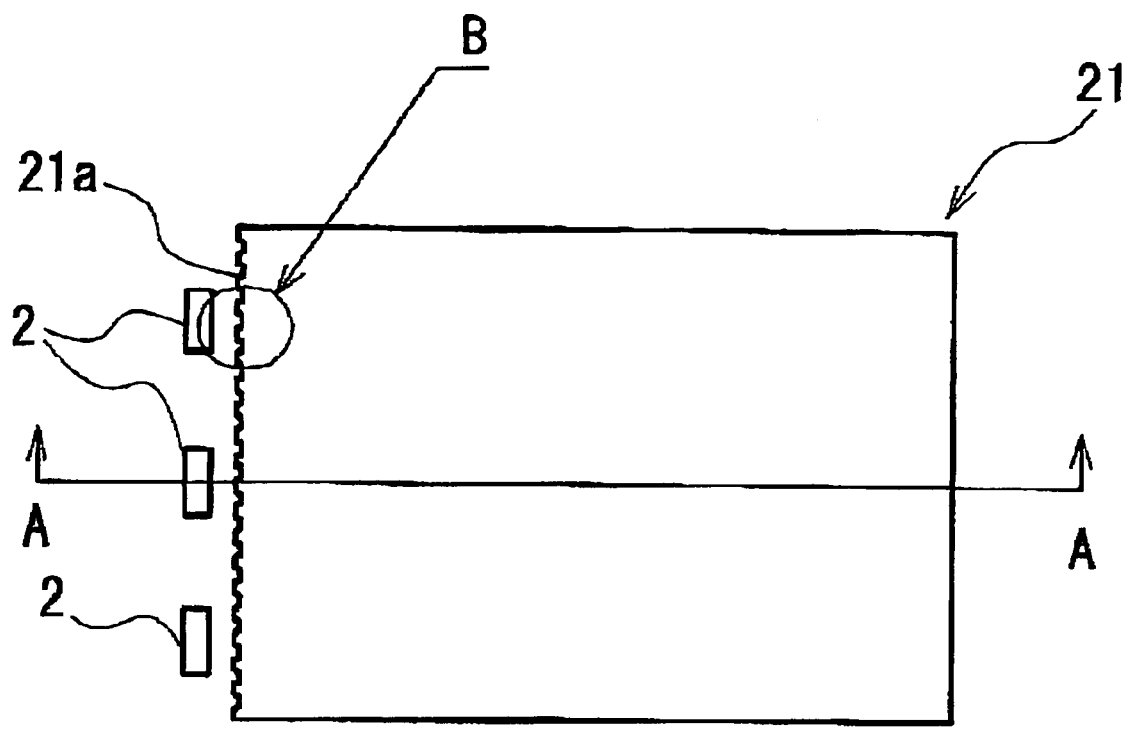
FIG. 8A is a plan view showing a side light type planar light source using a light guide plate according to a first embodiment of this invention.
Figure 8B:
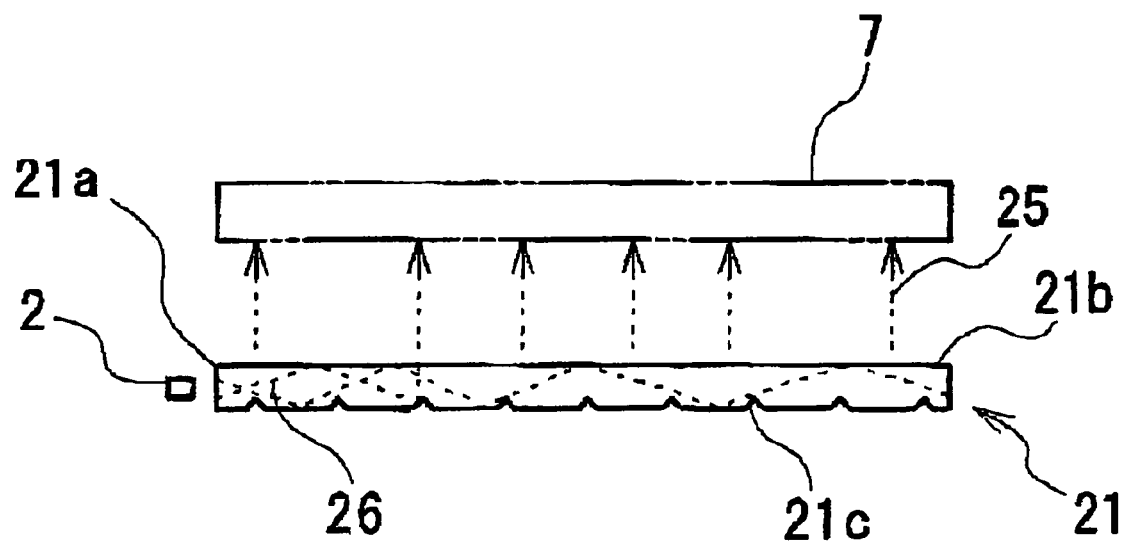
FIG. 8B is a cross-sectional view taken along the line A-A of FIG. 8A.

Now, preferred embodiments of the light guide plate according to this invention will be described in detail by referring to the accompanying drawings. FIG. 8A and FIG. 8B show a side light type planar light source using the light guide plate according to a first embodiment of this invention. In this embodiment, constitutional elements identical with the corresponding elements in the conventional light guide plate are given like reference numbers and their detailed descriptions omitted.

As shown in FIG. 8A and FIG. 8B, the planar light source in this embodiment has a light guide plate 21 and a light source 2 made up of three light emitting diodes (LEDs). The light guide plate 21 is formed as an almost rectangular prism-shaped plate member that is made by injection-molding a light-transmitting plastic material, such as acrylic resin. The light guide plate 21 has its upper surface formed as a light emitting face 21b. A bottom surface 21c of the light guide plate 21 opposite the light emitting face 21b is formed with a fine texture or a plurality of hemispherical dots to reflect the incoming light 26, which has entered into the light guide plate 21, toward the light emitting face 21b. Thus, the bottom surface 21c constitutes a light reflection surface.

One of side surfaces of the light guide plate 21 is a light incidence face 21a. At a position facing the light incidence face 21a is arranged the light source 2. As shown in FIG. 8B, light emitted from the light source 2 enters the light guide plate 21 through the light incidence face 21a and is then repetitively reflected inside the light guide plate 21 toward the light emitting face 21b until those components of light incident on the upper surface at smaller than the critical angle are emitted from the light emitting face 21b of the light guide plate 21 as illumination light 25. The illumination light 25 extracted outside then illuminates the liquid crystal panel 7 from the back. With the light emitting face 21b serving as a light illuminating surface (for the illumination light 25), the light guide plate 21 together with the light source 2 constitutes the side light type planar light source of this embodiment.

Figure 9A:
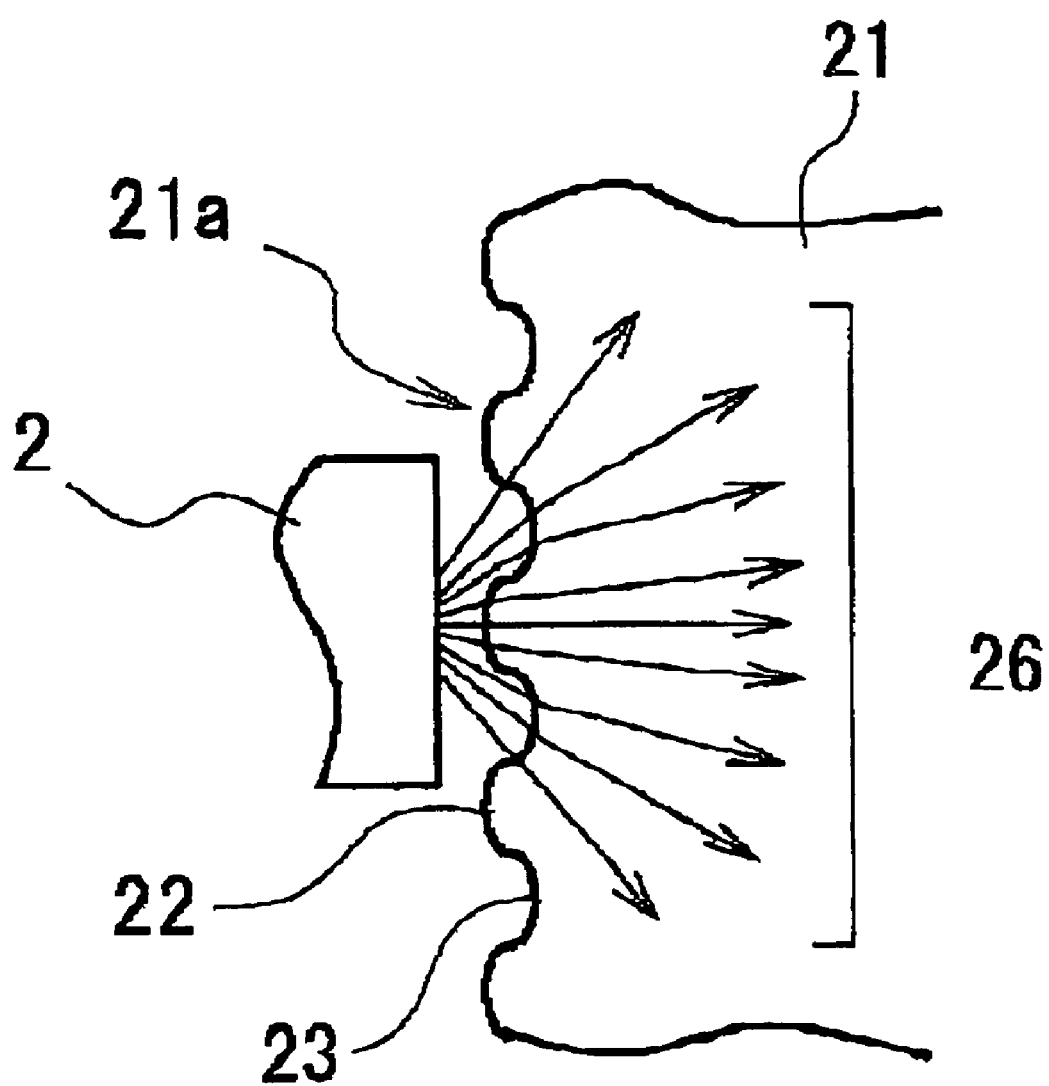
FIG. 9A is an enlarged view of part B of FIG. 8A.
Figure 9B:
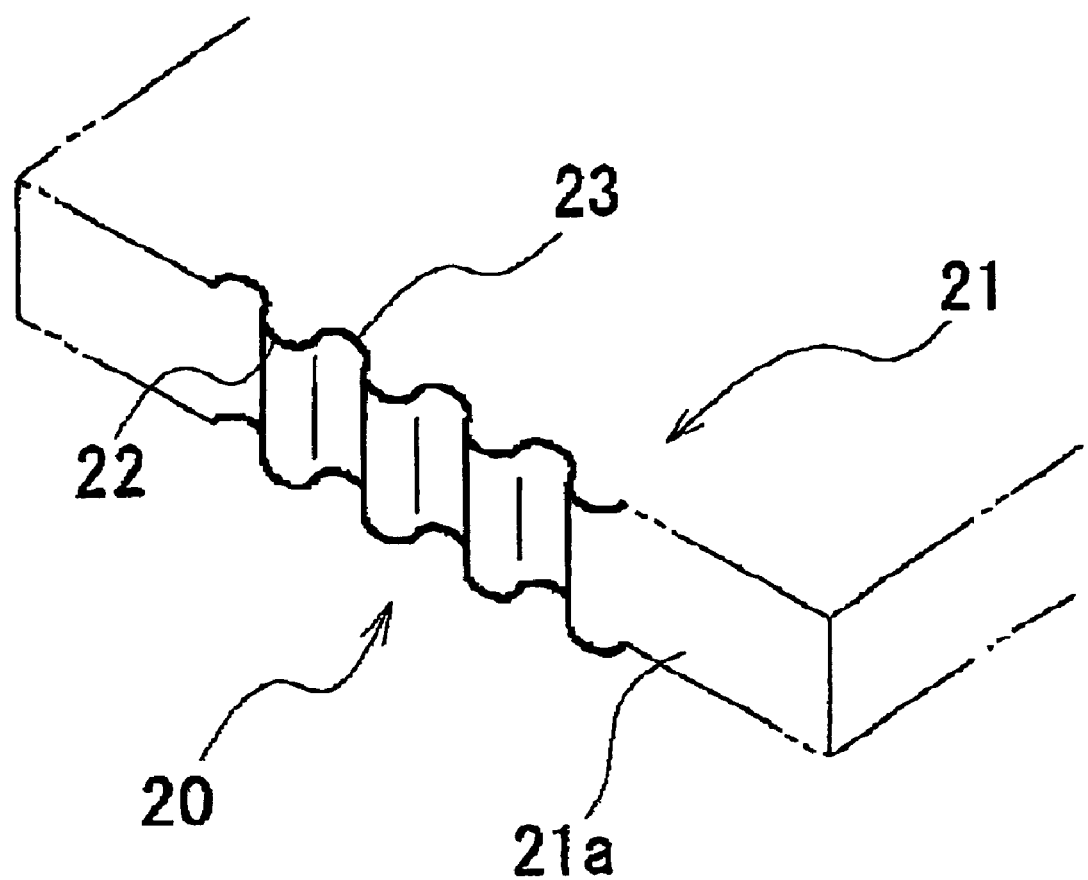
FIG. 9B is a partly enlarged plan view showing a light incidence face of FIG. 8A.

FIG. 9A and FIG. 9B show an enlarged view of part B in FIG. 8A. In the figure, the light incidence face 21a of the light guide plate 21 forms into an undulated surface portion 20. The undulated surface portion 20 in this example comprises raised portions 22 with a smooth curved surface and recessed portions 23 with a smooth curved surface, with the raised portions 22 and the recessed portions 23 alternately formed in a longitudinal direction of the light incidence face 21a of the light guide plate 21. Because the raised portions 22 and the recessed portions 23 are smoothly connected or merged, the undulated surface portion 20 when viewed as a whole provides a smooth, continuous undulated surface. Further, since the raised portions 22 and the recessed portions 23 have the same curved geometry and extend in the thickness direction of the light guide plate 21, they together form a smooth quadratic surface and therefore their transverse or horizontal cross section is shaped like a quadratic curve.

Figure 10:
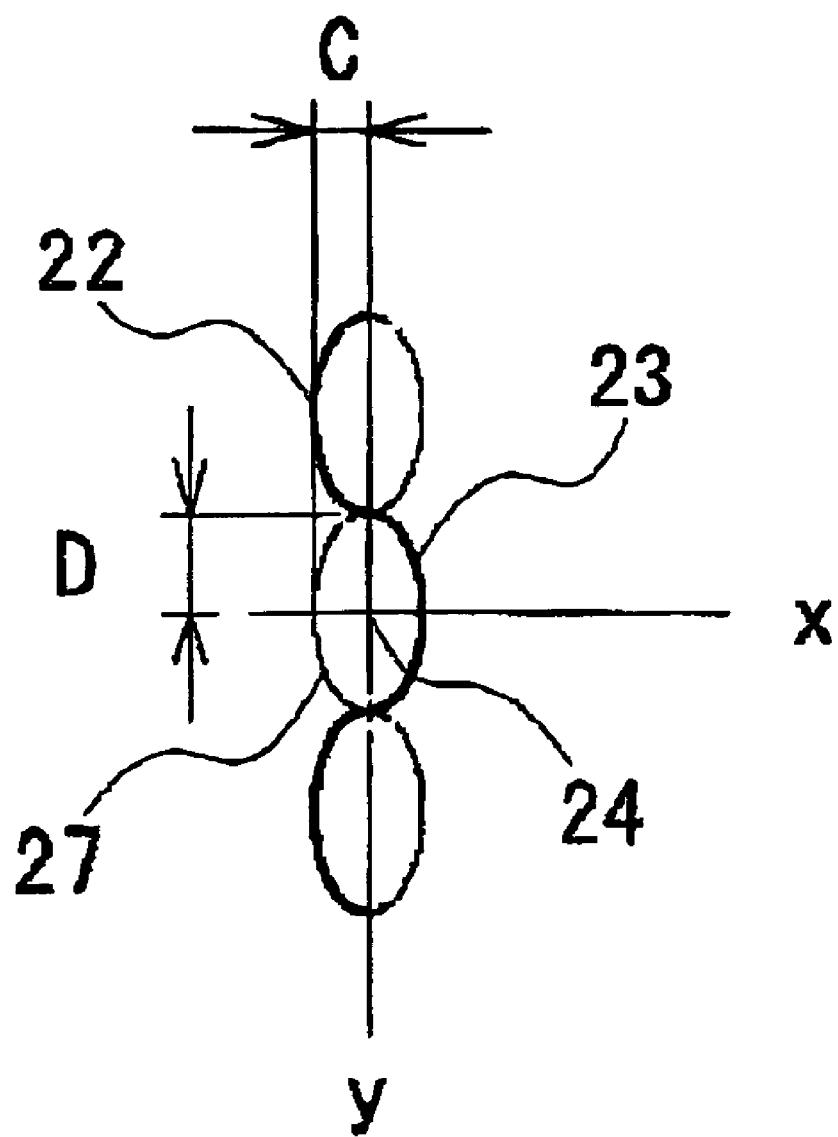
FIG. 10 is a partly enlarged plan view showing a light incidence face of the light guide plate in the first embodiment of this invention.

Although there are no particular limiting conditions on this quadratic curve, a geometry in horizontal cross section of the raised portions 22 and the recessed portions 23 in this embodiment is defined by a quadratic curve formed by an elliptic arc of an ellipse 27 which is described by an expression $x^2/C^2+y^2/D^2=1$, where C is a radius of the ellipse in an x-axis direction, D is a radius in an y-axis direction and a center of the ellipse is located at an intersecting point between the x-axis and the y-axis, as shown in FIG. 10. That is, the ellipse 27 is divided by the y-axis passing through the center 24 thereof. A quadratic curve formed by one elliptic arc is used to define the geometry of the horizontal cross section of the raised portions 22, and a quadratic curve formed by the other elliptic arc is used to define the geometry of the horizontal cross section of the recessed portions 23. If the light incidence face 21a is macroscopically viewed as a plane, the raised portions 22 and the recessed portions 23 are formed such that the y-axis direction of the ellipse 27 is parallel to the plane. It is preferred that the radii C, D of the ellipse 27 be set in a range of 30-500 μm.

Figure 11A:
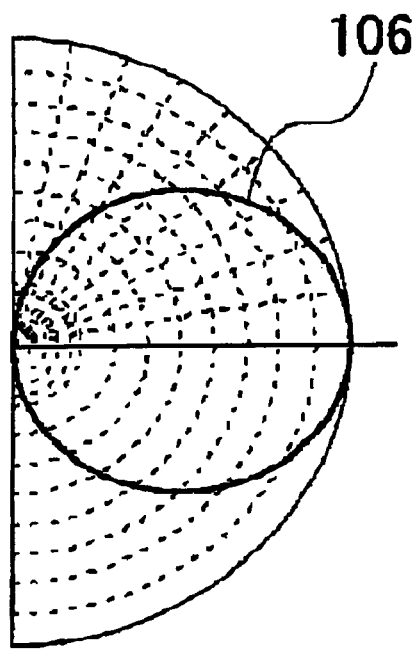
FIG. 11A is a diagram showing a characteristic curve 106 representing a directivity of light that passes through the light guide plate in the first embodiment of this invention.
Figure 11B:
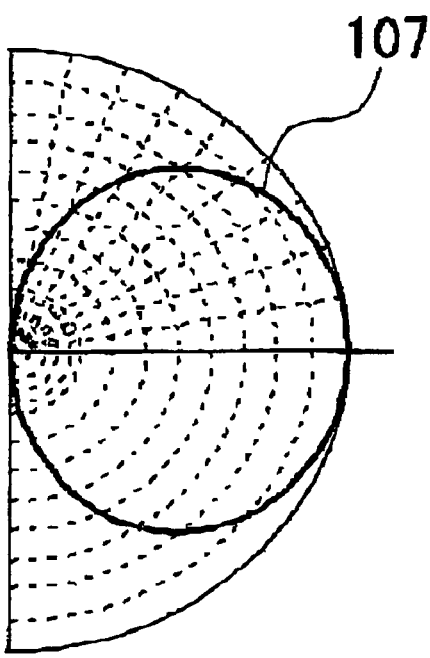
FIG. 11B is a diagram showing a characteristic curve 107 representing a directivity of light that has entered into the light guide plate in the first embodiment of this invention.
Figure 11C:
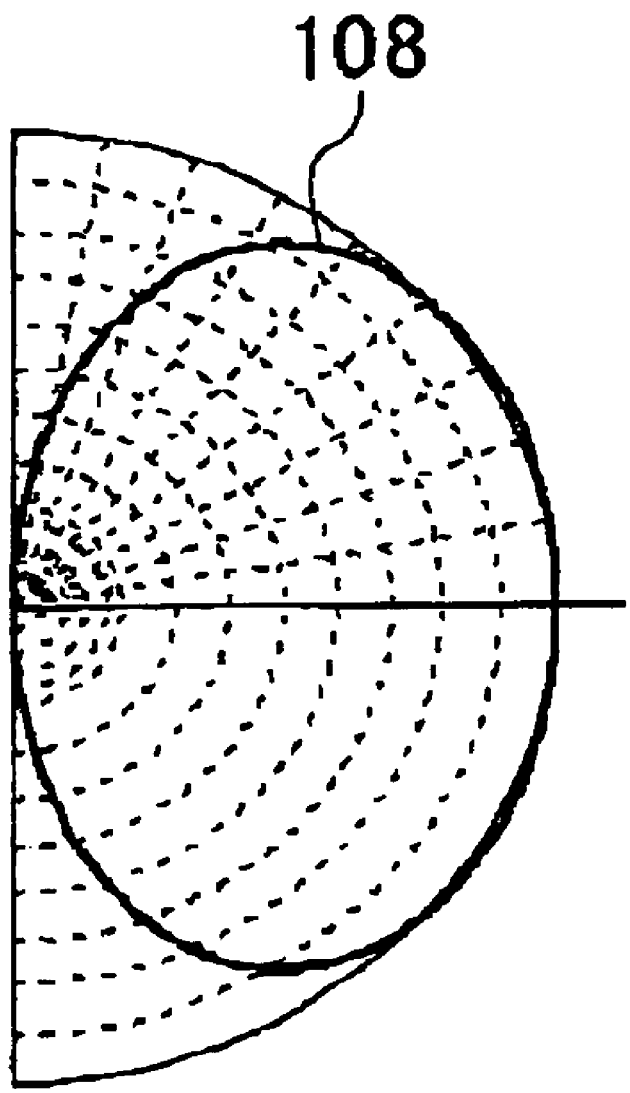
FIG. 11C is a diagram showing a characteristic curve 108 representing a directivity of light that has entered into the light guide plate in the first embodiment of this invention.

As described above, since the light guide plate 21 of this embodiment has its light incidence face 21a formed in a continuous, undulated, smooth quadratic curve in cross section, the throwing of light from the light source 2 into the light guide plate 21 through the light incidence face 21a allows light 26 to be diffused inside the light guide plate 21, making the intensity distribution of light 26 uniform. As a result, the directivity of light 26 is corrected, as indicated by a characteristic curve 106 of a smooth circle in FIG. 11A, so that the directivity smoothly changes between portions of strong light intensity and weak light intensity. This arrangement can prevent bright lines or spots from being produced near the light source 2. Characteristic curves 107, 108 in FIG. 11B and FIG. 11C represent a directivity of light 26 inside the light guide plate 21 when the geometries of the raised portions 22 and the recessed portions 23 are changed by changing a ratio of radii C, D of the ellipse 27, or D/C. By changing the shape of the raised portions 22 and the recessed portions 23 as described above, the directivity of light 26 inside the light guide plate 21 can be controlled.

Therefore, by changing the value of D/C, a ratio between the radii C, D of the ellipse 27, according to the positional relation between the light guide plate 21 and the light source 2, it is possible to optimize the geometry of the light incidence face 21a and thereby correct the directivity of light 26 that has entered the light guide plate 21 through the light incidence face 21a, thus providing a well balanced directivity characteristic without undue deviations.

As shown in FIG. 8B, the light 26 that has entered the light guide plate 21 is repetitively reflected between the light emitting face 21b and the bottom surface 21c as it travels in the light guide plate 21 until those components of light incident on the upper surface at smaller than the critical angle are emitted from the light emitting face 21b as illumination light 25 to illuminate the liquid crystal panel 7 from the back. This arrangement makes it possible to reduce brightness variations on the screen of the liquid crystal panel 7 and thereby display high quality images.

Figure 12A:
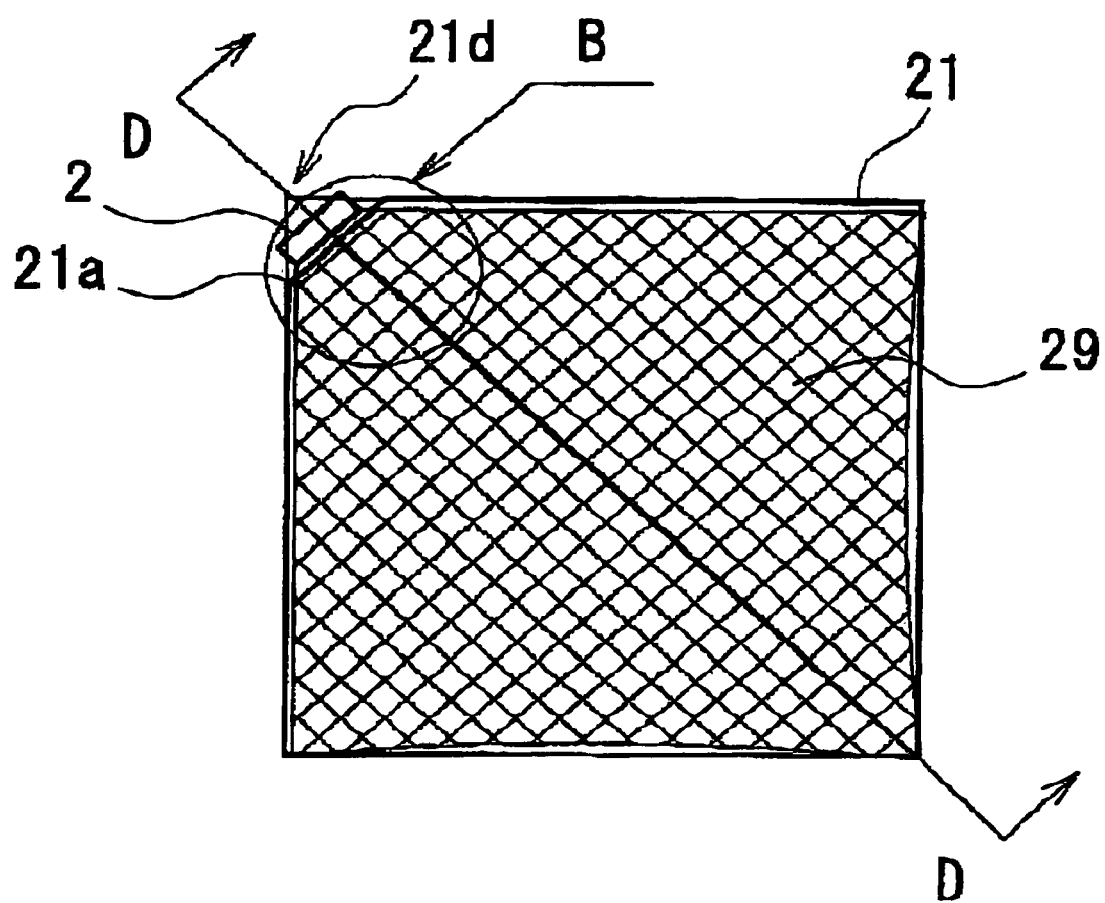
FIG. 12A is a plan view showing a side light type planar light source using a light guide plate according to a second embodiment of this invention.
Figure 12B:
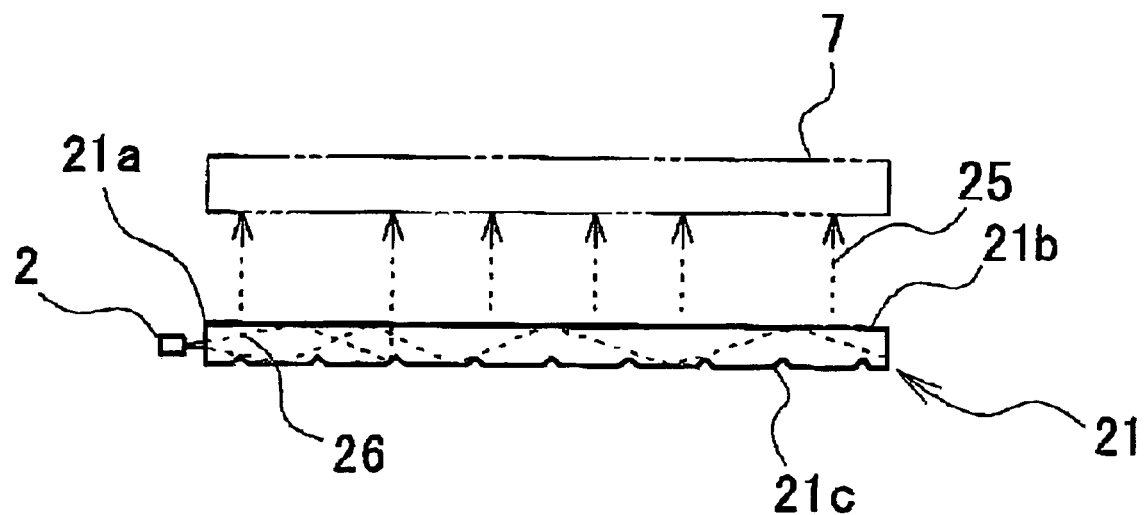
FIG. 12B is a cross-sectional view taken along the line D-D of FIG. 12A.

FIG. 12 and FIG. 13 show a second embodiment of the light guide plate according to this invention. The light guide plate 21 of this embodiment is similar in construction to the light guide plate of the first embodiment except that one corner portion 21d of the almost rectangular prism-shaped plate member is cut off to form an additional side surface as the light incidence face 21a. So, constitutional elements identical with the corresponding elements in the first embodiment are given like reference numbers and detailed descriptions of the light guide plate omitted.

At a position facing the light incidence face 21a which is the cut-off corner portion of the light guide plate 21 is installed a light source 2 made up of one LED. As in the preceding embodiment, light emitted from the light source 2 enters the light guide plate 21 through the light incidence race 21a to become light 26. The light 26 in the light guide plate 21 is then repetitively reflected inside the light guide plate 21 toward the light emitting face 21b until those components of light incident on the upper surface at smaller than the critical angle are emitted from the light emitting face 21b of the light guide plate 21 as illumination light 25. The illumination light 25 emitted outside then illuminates the liquid crystal panel 7 from the back.

Figure 13A:
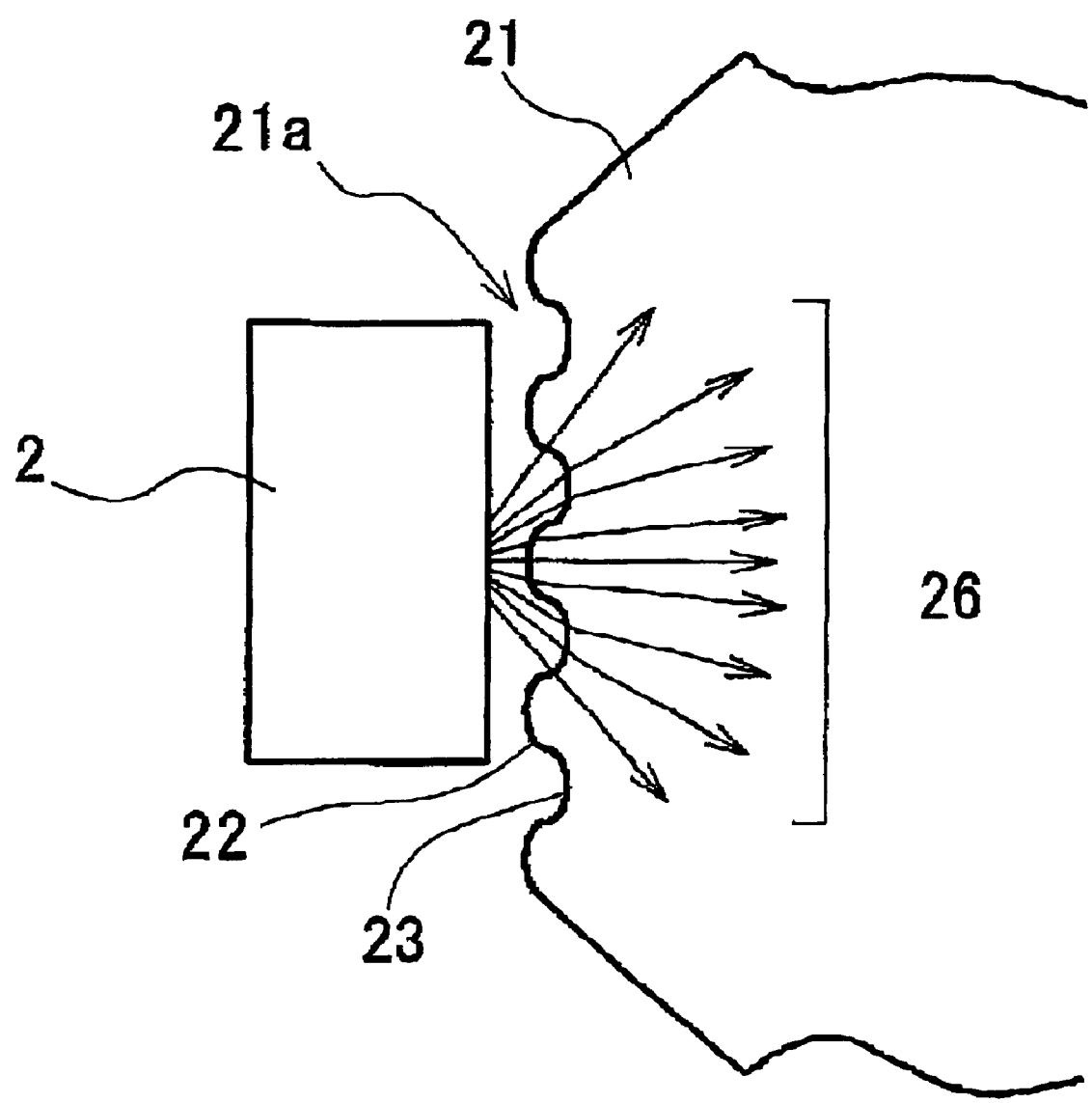
FIG. 13A is an enlarged view of part B in FIG. 12A.
Figure 13B:
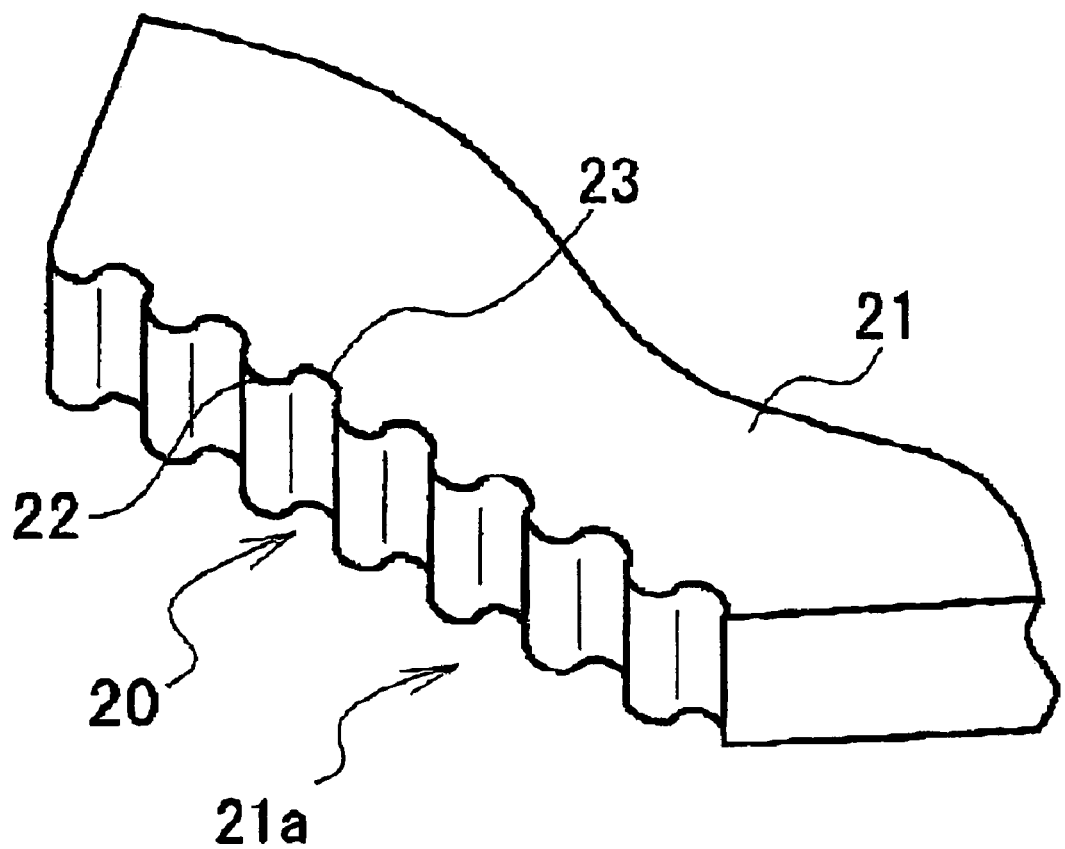
FIG. 13B is a partly enlarged perspective view of a light incidence face in FIG. 12A.

The light incidence face 21a on the cut-off corner portion of the light guide plate is formed with an undulated surface portion 20 as in the preceding embodiment, as shown in FIG. 13A and FIG. 13B. The undulated surface portion 20 comprises raised portions 22 with a smooth curved surface and recessed portions 23 with a smooth curved surface, with the raised portions 22 and the recessed portions 23 alternately formed in a longitudinal direction of the light incidence face 21a of the light guide plate 21. Because the raised portions 22 and the recessed portions 23 are smoothly connected or merged, the undulated surface portion 20 when viewed as a whole provides a smooth, continuous undulated surface. Further, since the raised portions 22 and the recessed portions 23 have the same curved geometry and extend in the thickness direction of the light guide plate 21, they together form a smooth quadratic surface and therefore their transverse or horizontal cross section is shaped like a quadratic curve. This construction is also similar to the preceding embodiment. Thus, the quadratic curve produces the similar effect to that of the preceding embodiment explained in FIG. 10 and FIG. 11 and therefore their explanations are omitted here.

While in the first and second embodiment, our descriptions concern the almost rectangular prism-shaped light guide plate 1, the present invention is not limited to this construction. The invention can also be applied to other than the rectangular prism-shaped light guide plate, such as polygonal light guide plates.

Further, in the second embodiment the construction has been described in which one corner of the light guide plate is cut off to form a light incidence face and in which a light source made up of one LED is installed to face the light incidence face. This invention can also be applied to side light type planar light sources in which a plurality of light incidence faces are formed on two or more cut-off corner portions or in which a plurality of LEDs are arranged on the light incidence faces.

In the first and second embodiment, the construction has been described in which the light incidence face, whose cross section is defined by a quadratic curve, forms into a smoothly connected or merged, undulated surface. This invention is not limited to this construction and may, for example, employ a construction in which the light incidence face forms into an undulated surface whose cross section is defined by a third- or fourth-degree curve.

Further, in the above embodiments an example case has been described in which the raised portions and the recessed portions are directly connected. This invention is not limited to this construction and may be applied to a construction in which the raised portions and the recessed portions may be connected together with a smooth curved portion or a planar portion interposed in between.

Further, in the above embodiments it is assumed that no surface treatment is performed on the light incidence face of the light guide plate. This invention may be applied to other construction in which the light incidence face forms into a rough surface to scatter light. This can further reduce brightness variations.

Further, although in the above embodiments the light incidence face has been described to be formed by alternating the raised portions and the recessed portions of the same shape, it is also possible to form the raised portions and the recessed portions by combining a plurality of curved surfaces or to progressively change the geometry of the raised portions and the recessed portions as a point of interest moves away from the light source, according to the directivity of light emitted from the light source. This allows for a smoother change in directivity.

Further, in the above embodiments, the construction has been described in which the light guide plate of this invention is applied to a planar light source of a liquid crystal display. This invention is not limited to this construction but may be applied to a wide range of side light type planar light sources used on a variety of illumination devices and displays.

What is claimed is:

1. A light guide plate comprising: a plate member having a light transmitting capability; and a light incidence face which is a side surface of the plate member; wherein the plate member changes a path of light emitted from a light source arranged to face the light incidence face and emits planar illumination light from an upper surface of the plate member onto an object to be illuminated; wherein the light incidence face is formed to have an undulating surface portion defined by a quadratic curve and comprising rounded recessed portions and rounded raised portions interposed between the rounded recessed portions, the recessed portions and raised portions following one another in a longitudinal direction of the light incidence face, and wherein the undulating surface portion is formed by smoothly connecting each of the recessed portions and each of the raised portions alternately, and wherein a surface of each of the rounded recesses and raised portions is formed into a rough light diffusion surface.

2. A light guide plate according to claim 1, wherein the plate member is quadrangular-shaped and has the light incidence face which is one of side surfaces thereof.

3. A light guide plate according to claim 1, wherein the plate member is quadrangular-shaped and at least one of corner portions of the plate member is cut off to form an additional side surface, which is provided as the light incidence face.

4. A light guide plate according to claim 1, wherein the rounded recessed portions and rounded raised portions have a continuous curved shape and each portion has the shape of one-half of an ellipse formed by dividing an ellipse in half along one axis of the ellipse.

5. A light guide plate according to claim 4, wherein each ellipse has a semimajor axis and a semiminor axis, each axis having a length of 30 to 500 μm.

6. A light guide plate according to claim 1, wherein the longitudinal direction of the light incidence face is substantially parallel to the upper surface of the plate member.

7. A light guide plate comprising: a plate member having a light transmitting capability; and a light incidence face which is a side surface of the plate member; wherein the plate member changes a path of light emitted from a light source arranged to face the light incidence face and emits planar illumination light from an upper surface of the plate member onto an object to be illuminated; wherein the light incidence face is formed to have an undulating surface portion defined by a quanratic curve and comprising rounded recessed portions and rounded raised portions interposed between the rounded recessed portions, the rounded recessed portions and rounded raised portions following one another in a longitudinal direction of the light incidence face, and wherein the undulating surface portion is formed by smoothly connecting each of the rounded recessed portions and each of the rounded raised portions alternately, and wherein the rounded recessed portions and the rounded raised portions are configured to gradually change with distance from the light source.

* * * * *

UNITED STATES PATENT AND TRADEMARK OFFICE
CERTIFICATE OF CORRECTION

PATENT NO. : 7,357,557 B2  Page 1 of 1
APPLICATION NO. : 11/058411
DATED : April 15, 2008
INVENTOR(S) : Junji Miyashita It is certified that error appears in the above-identified patent and that said Letters Patent is hereby corrected as shown below:

Claim 1, column 8, line 45, change "recesses" to --recessed--.

Signed and Sealed this

Eleventh Day of November, 2008

JON W. DUDAS
*Director of the United States Patent and Trademark Office*